United States Patent [19]

Brenden et al.

[11] Patent Number: 4,545,653

[45] Date of Patent: Oct. 8, 1985

[54] FOCUSING ELEMENTS AND SYSTEM FOR PRODUCING A PRESCRIBED ENERGY DISTRIBUTION ALONG AN AXIAL FOCAL ZONE

[75] Inventors: Bryon B. Brenden, Richland, Wash.; James T. Russell, Salt Lake City, Utah

[73] Assignee: Digital Recording Corporation, Salt Lake City, Utah

[21] Appl. No.: 542,132

[22] Filed: Oct. 14, 1983

Related U.S. Application Data

[62] Division of Ser. No. 223,229, Jan. 7, 1981, Pat. No. 4,426,696.

[51] Int. Cl.$^4$ .............................................. G02B 13/18
[52] U.S. Cl. .................................................... 350/432
[58] Field of Search ............................ 350/432–435; 356/138

[56] References Cited

U.S. PATENT DOCUMENTS

| 2,759,393 | 8/1956 | McLeod | 350/432 |
| 3,501,586 | 3/1970 | Russell | 369/44 |
| 4,083,272 | 4/1978 | Miller | 82/12 |
| 4,090,031 | 5/1978 | Russell | 358/130 |
| 4,133,600 | 1/1979 | Russell et al. | 350/3.72 |
| 4,142,209 | 2/1979 | Hedlund et al. | 360/77 |
| 4,356,375 | 10/1982 | Josephy et al. | 356/138 X |

OTHER PUBLICATIONS

Saito, T. T.; "Diamond Turning of Optics"; *Optical Engineering;* vol. 17, No. 6; Nov.-Dec. 1978.
Miller et al; "Precision Machining of Optics"; *Proc. of the Soc. of Photo-Opt. Instr. Eng.;* vol. 159, pp. 32-41; Aug. 1978.
Rioux et al; "Linear, Annular and Radial Focusing with Axicons and Applications to Lasar Machining"; *Applied Optics;* vol. 17, No. 10; May 15, 1978; pp. 1532-1536.
Baranov, V. K.; "Focons and Foclines as Concentrators of the Radiation of Extended Objects"; *Soviet Jour. of Opt. Technology;* vol. 44, No. 2; Feb. 1977; pp. 66-69.
Lit et al; "Focal Depth of a Transmitting Axicon"; *Jour. of the Optical Soc. of Amer.;* vol. 63, No. 4; Apr. 1973; pp. 445-449.
Jenkins et al; *Fundamentals of Optics;* McGraw-Hill Publ.; 1957; pp. 7-10.
McLeod, J. H.; "The Axicon: A New Type of Optical Element"; *Jour. of the Opt. Soc. of Amer.;* No. 44; Aug. 1954; pp. 592-597.
Collins, H. D.; "Acoustical Interferometry Using Electronically Simulated Variable Reference & Multiple Path Techniques"; *Acoustical Holography;* vol. 6; 1975; pp. 597-619.
Edmonds, W. R.; "Imaging Properties of a Conic Axicon"; *Applied Optics;* vol. 13, No. 8, Aug. 1974; pp. 1762-1764.
Burckhardt et al; "Methods for Increasing the Lateral Resolution of B-Scan"; *Acoustical Holography;* vol. 5; 1973; pp. 391-413.
Burckhardt et al; "Ultrasound Axicon"; *Jour. of the Acoustical Soc. of America;* vol. 54, No. 6; 1973; pp. 1628-1630.

*Primary Examiner*—John K. Corbin
*Assistant Examiner*—Scott J. Sugarman
*Attorney, Agent, or Firm*—Klarquist, Sparkman, Campbell, Leigh & Whinston

[57] ABSTRACT

An optical playback system for reading data from a record includes a focusing system for focusing a scanning light beam onto data on the record without need for precision positioning of the record and optical elements of the system. The light beam is modulated by the data and then transmitted to a light detector to produce a playback data signal corresponding to the recorded data. The focusing system includes a source of light having an axially symmetric intensity distribution and a lens designed to focus such light into a focal zone with a specified intensity distribution along the zone. This distribution is preferably uniform so as to provide the detector with a modulated light beam of uniform average intensity regardless of the position of the record along to focal zone . The lens is but one member of an entire family of nonconical, aspherical axicon-type focusing elements designed in accordance with a method described herein to focus energy from given source to a prescribed focal zone intensity distribution.

17 Claims, 11 Drawing Figures

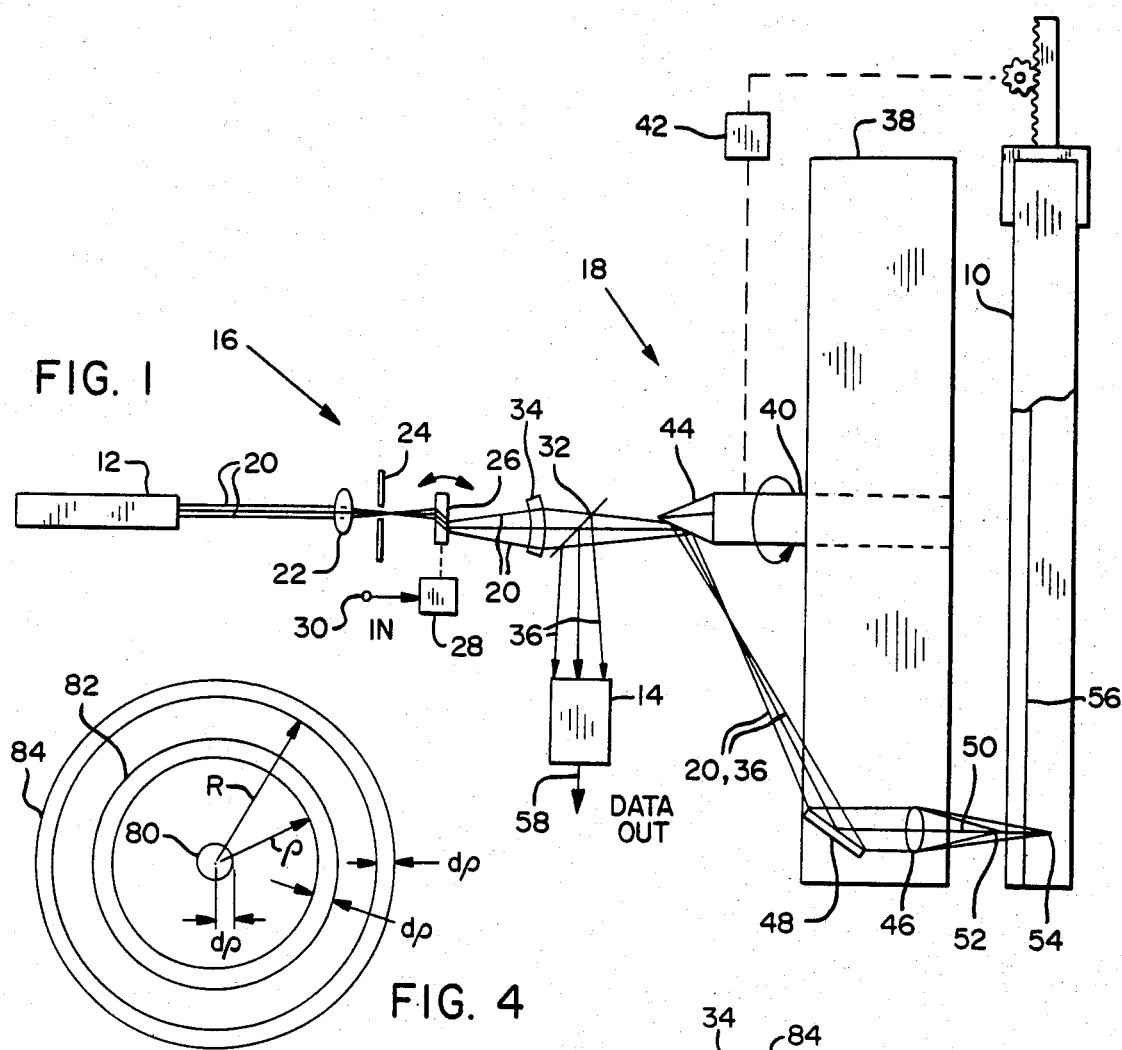
FIG. 1
FIG. 4
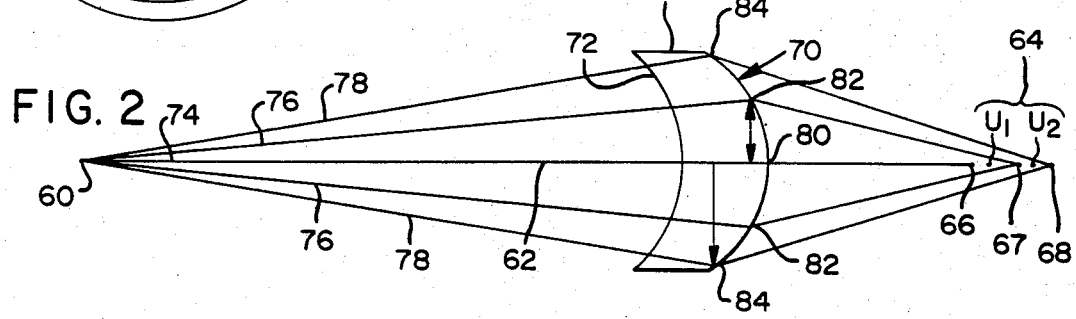
FIG. 2
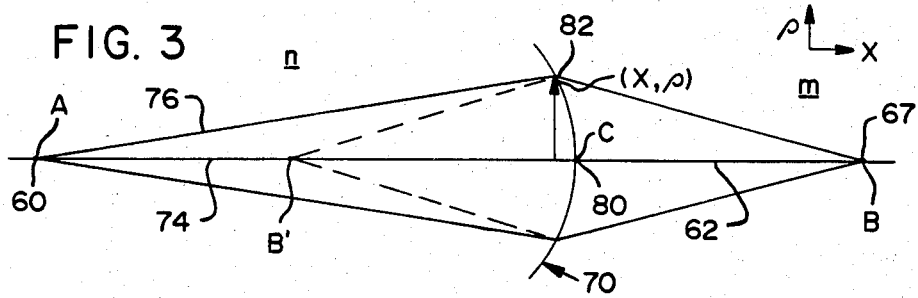
FIG. 3

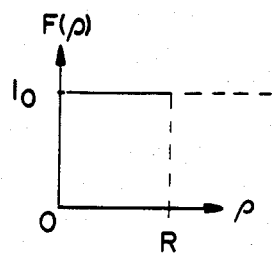
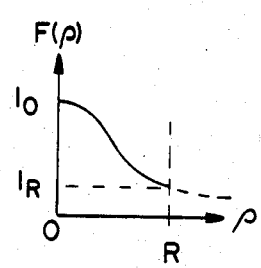
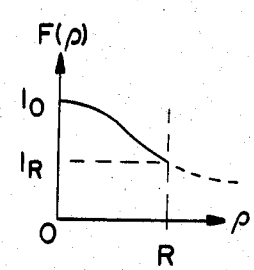
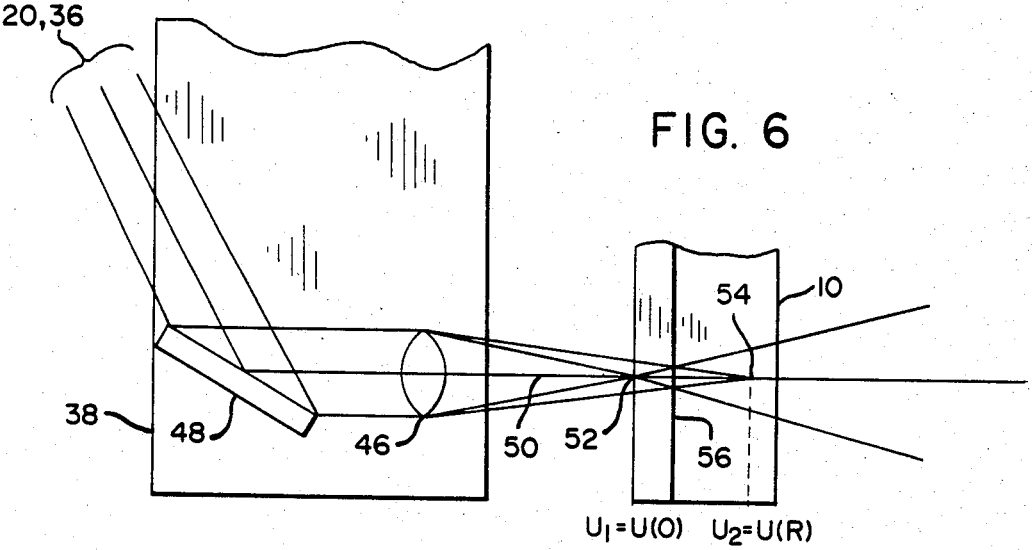
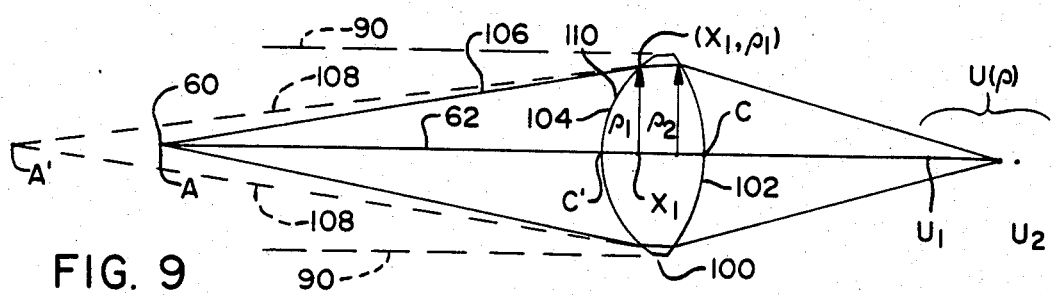

FOCUSING ELEMENTS AND SYSTEM FOR PRODUCING A PRESCRIBED ENERGY DISTRIBUTION ALONG AN AXIAL FOCAL ZONE

This is a division of application Ser. No. 223,229 filed Jan. 7, 1981, now U.S. Pat. No. 4,426,696.

BACKGROUND OF THE INVENTION

This invention relates generally to optical playback apparatus and universal focusing systems, and more particularly to axicon-type focusing elements.

In the area of optical recording and playback apparatus, the accurate resolution of data on an optical data record has proven difficult to obtain. U.S. Pat. Nos. 3,501,586 and 4,090,031 to Russell and 4,142,209 to Hedlund, et al. disclose examples of such apparatus.

Typically, optical data is recorded along a track in the form of a very fine optical pattern, such as closely-spaced microscopic dots. This data is played back by scanning a light beam along the track to modulate the light beam in accordance with the optical pattern. The modulated beam is either transmitted or reflected to a light detector which produces an electrical output signal in accordance with the modulation of the beam. If all goes well, this signal faithfully reproduces the optical pattern to play back the originally recorded signal. However, numerous factors effect the ability to faithfully reproduce the recorded signal.

One important factor is the ability to focus the beam in the plane of the optical pattern and to maintain focus during playback. Prior playback systems employ a fixed or adjustable focal length focusing system including spherical or other point-focusing lenses. The focal point of the focusing system is positioned in the plane of the optical pattern by a variety of techniques. Examples of such techniques include moving either the optical elements or the record or both along the optical axis.

Initially, the optical elements and record are positioned manually. Because the optical pattern is typically very small and dense, positioning must be very precise. The problem is compounded by the need for accurate angular alignment of such elements. Thus, positioning the optical elements can be very difficult and time consuming.

Once the optical elements and record are initially positioned, focusing continues to be a problem during the operation of the playback system. The optical records are seldom truly planar. The mechanisms supporting and moving the records also have a certain amount of play in them. In the Hedlund, et al. apparatus of U.S. Pat. No. 4,142,209, the optical elements are shifted along the optical axis to scan different tracks. All of these factors can dynamically change the relative positions of the optical elements and record, causing the focal point to deviate from its ideal position. As a result, the image of data pattern tends to move in and out of focus causing errors during playback.

Accordingly, there is a need in optical playback systems for means for focusing the light beam on optical data patterns which obviates the need for highly precise positioning of the focusing elements and record. Such beam-focusing means should also be immune to dynamic variations in the relative position of its elements and the record in an optical playback apparatus.

In the field of optics, researchers have long sought a universal focus lens. In 1954, J. H. McLeod published a paper entitled "The Axicon: A New Type of Optical Element" in the *Journal of the Optical Society of America*, No. 44, pp. 592–597, indicating the discovery of such a lens. In this paper, McLeod defined the axicon and described several examples: a toric lens, a right conical lens and reflector, a hollow refractive sphere and a hollow reflective cylinder. McLeod also described possible uses for axicons in telescopes, microscopes, projectors and autocollimators.

Since 1954, further examples and applications of axicons have been identified. In an article entitled "Focons and Foclines as Concentrators of the Radiation of Extended Objects," *Soviet Journal of Optical Technology*, February 1977, pp. 66–69, V. K. Baranov describes two families of reflecting axicons—the parabolic-toroidal focon and the parabolic-cylindrical focline—and their ability to concentrate light from an extended source to a point. M. Rioux, et al. discussed the use of axicons in combination with lasers in an article entitled "Linear, Annular, and Radial Focusing with Axicons and Applications to Laser Machining," *Applied Optics*, Vol. 17, No. 10, pp. 1532–1536, May 15, 1978.

Axicons have also been found to be applicable to forms of energy other than electromagnetic. Acoustical axicons and their applications are discussed in two articles by C. B. Burckhardt, et al. entitled "Ultrasound Axicon: A Device for Focusing Over a Large Depth," *Journal of the Acoustical Society of America*, No. 6, 1973, pp. 1628–30 and "Methods For Increasing The Lateral Resolution of B-Scan," *Acoustical Holography*, Vol. 5, 1973, pp. 391–413, and in an article by H. D. Collins entitled "Acoustical Interferometry Using Electronically Simulated Variable Reference And Multiple Path Techniques," *Acoustical Holography*, Vol. 6, 1975, pp. 597–619.

Certain imaging characteristics of conical axicons are analyzed in an article entitled "Imaging Properties of a Conic Axicon," *Applied Optics*, August 1974, pp. 1762–1764 by W. R. Edmonds. In an article entitled "Focal Depth of a Transmitting Axicon," *Journal of the Optical Society of America*, April 1973, pp. 445–449, J. W. Y. Lit, et al. examined the axial field distribution of conical and curved conical axicons for plane uniform incident energy and for gaussian distribution incident energy. Lit, et al. noted that the focal zone intensity distribution would vary from point to point along the axis of a conical axicon.

However, none of the foregoing references deal with the problems of employing an axicon in an optical playback system. The references suggest that something approaching a universal focusing system can be made using an axicon. However, they do not recognize the problems that the variation of intensity of energy focused onto the axis of an axicon can create in an optical recording and playback system. For example, with a conical axicon, the variation in focal zone intensity can be great enough to completely mask the modulation of a light beam scanned across an optical record.

U.S. Pat. No. 4,133,600 to Russell, et al. uses a conical axicon lens to try to alleviate tolerance requirements in regard to positioning or flatness of the record. However, the axicon is used only for formation of holographic lens means, not during recording or playback of data.

Likewise, none of the references suggest an axicon focusing system or method of making axicons which will eliminate or control this intensity variation. Accordingly, there remains a need for a focusing system which will provide both nearly universal focusing and a controllable intensity distribution within a focal zone for playing back data on an optical record.

SUMMARY OF THE INVENTION

It is, therefore, an object of the invention to focus a beam of energy on an axial point regardless of changes in the position of such point along a finite length line.

A second object of the invention is to focus the beam with a specifiable intensity distribution along such line.

A third object is to focus the beam as aforesaid with a uniform intensity distribution along such line.

Another object of the invention is to focus energy as aforesaid from a beam having a gaussian radial intensity distribution.

A further object is to focus energy from a collimated beam, such as that produced by a laser, into an axial focal zone with a specifiable energy distribution along a portion of such zone.

A still further object of the invention is to provide a method for making an energy-focusing element, such as a lens or reflector, usable either alone or with other elements, to focus a beam of energy into an axial focal zone with a prescribed intensity distribution.

An additional object of the invention is to provide a focusing element having a refractive boundary operable to focus a beam of energy to a finite length line with a specifiable intensity distribution along such line.

Another object is to provide a family of focusing elements as aforesaid in which the refractive boundary is adjustable to accommodate incident energy beams having differing axially symmetrical intensity distributions to produce a specificable focal zone intensity distribution.

A further object is to provide a method of making focusing elements having the foregoing characteristics.

A specific object of the invention is to provide for a family of axicon-like optical-focusing elements having a nonconical, aspherical refractive surface.

Another specific object is to provide for a family of axicon-like optical lenses having an aspherically curved surface and an opposite concave or convex surface.

A further specific object is to provide an optical playback system with means for focusing light on data in an optical record so as to produce a substantially uniformly modulated light beam regardless of errors in the relative position of the record and optical elements of the system along its optical axis.

To satisfy the foregoing objects, we have invented both a family of nonconical curved, axicon-type focusing elements and a method for making such elements. In the context of this invention, the terms "focusing element," "focusing medium" and "axicon" are used interchangeably to refer to any kind of energy-focusing means. They include both reflective elements, or mirrors, and transmissive elements, or lenses. Such elements can have discrete boundaries or surfaces, or they can be formed of continuous focusing media. They can also include lens and reflectors for focusing acoustical energy such as ultrasonic waves, optical lenses and mirrors, and antennae for focusing microwaves.

One feature of the invention is an axially symmetrical, nonconical aspheric focusing element configured in accordance with an axially symmetrical incident energy beam to a line, or axial focal zone, having a prescribed output intensity or energy distribution between two different points. Another feature of the invention is a method of making such a focusing element.

Yet another feature is a configuration of the focusing medium defining such focusing element, which is specified for an incident energy beam having a particular input radial intensity distribution in accordance with a radially continuous, curved function of the input and output intensity distributions. This feature enables the lens to be matched to both the characteristics of the incident energy beam and the desired intensity distribution along the focal zone.

The foregoing and other objects, features and advantages of the invention will become more apparent from the following detailed description of a preferred embodiment of the invention, which proceeds with reference to the accompanying drawings.

BRIEF DESCRIPTION OF THE DRAWINGS

FIG. 1 is a schematic diagram of one embodiment of an optical playback apparatus for a reflective-type optical data record, incorporating a focusing system according to the present invention.

FIG. 2 is an enlarged, vertical cross-sectional view of a concave-convex axicon lens such as that of FIG. 1 showing the focusing of incident energy from a point source to a focal zone.

FIG. 3 is a line diagram of the convex surface of the lens of FIG. 2, the unbroken rays indicating refraction of the incident energy and the dashed rays indicating reflection of such energy when the surface is used as a concave mirror.

FIG. 4 is a front elevational view of the surface of FIG. 3.

FIGS. 5a, 5b and 5c are examples of incident energy intensity distributions from various sources, FIG. 5a showing a uniform distribution and FIGS. 5b and 5c showing truncated Gaussian distributions.

FIG. 6 is an enlarged vertical cross-sectional view of a portion of the scanner and record of FIG. 1 illustrating the focal zone produced by the lens of FIG. 2.

FIG. 7 is a preferred focal zone intensity distribution produced by a focal system in accordance with the invention.

FIG. 8 is another example of a prescribed focal zone intensity which a focusing system can be made to produce in accordance with the invention.

FIG. 9 is a vertical cross-sectional view of a double-convex lens according to the invention.

DESCRIPTION OF PREFERRED EMBODIMENT

Optical Playback Apparatus

Referring to FIG. 1, an optical playback apparatus for playing back data recorded on an optical record 10 comprises a light source 12, a light detector means 14, a focusing means 16 for focusing light emitted from the light source, and scanning means 18 for scanning the focused beam across record 10.

The light source 12 is preferably a laser which produces coherent light in a narrow frequency band. However, any essentially point source of light can be used which produces an axially symmetrical light beam 20.

Beam 20 is directed toward focusing means 16. The focusing means preferably includes a primary point-focusing lens 22, an apertured light mask, commonly referred to as a "pinhole" element 24, and a "tipping" plate 26. The foregoing elements are aligned along the optical axis of beam 20. Lens 22 focuses beam 20 through the pinhole of element 24 to shape the light spot for imaging onto the optical record 10. The tipping plate is positioned in the path of the shaped light beam to laterally displace the light beam through small angles by refraction. The tipping plate is pivoted by a galvanometer-type motor 28 in response to a tracking signal applied to its input 30 to cause the light beam to stay on the data track being scanned. The details of construction and operation of the foregoing elements are discussed in U.S. Pat. Nos. 3,891,794 and 4,090,031 to Russell and, hence, need not be further discussed herein.

The focusing means 16 also includes a beam-splitter mirror 32 and an axicon lens 34 positioned to receive beam 20 from the tipping plate. The beam splitter is positioned between lens 34 and the tipping plate so as to transmit light from lens 34 in one direction and to reflect a return light beam 36 to light detector 14. Alternatively, lens 34 can be positioned between the pinhole element and the tipping plate. It is also possible to eliminate the pinhole element and lens 22 altogether. Other positions for lens 34 are also possible.

From the focusing means, beam 20 passes to the scanning means 18. The scanning means comprises a rotating scanner wheel 38 mounted for rotation on a shaft 40. The shaft is driven at a constant speed by electrical motor 42 coupled thereto. The axis of rotation of shaft 40 is parallel to the optical axis of lens 34. A rotating distributor mirror member 44 is mounted on the end of shaft 40 adjacent lens 34. The distributor member 44 has an outer surface in the form of a five-sided pyramid, having five mirrors provided thereon which correspond to five objective lenses 46 carried on the scanner wheel near its outer periphery. Associated with each of these lenses is a mirror 48 positioned to reflect light from one of the sides of the distributor member into one of the lenses 46. The distributor member rotates with the scanner wheel at the same angular velocity as the lenses 46 and mirrors 48. Accordingly, each mirror of the distributor member is always optically aligned with its associated objective lens. The distributor mirror member is offset slightly from the optical axis of lens 34 so that it distributes light beam 20 to the objective lenses 46 one at a time as such lenses rotate across record 10 to play back the optical data recorded thereon.

Absent lens 34, lenses 22 and 46 focus light beam 20 to a small spot along the optical axis 50 of lens 46 in a selected focal plane intermediate points 52, 54 as described in U.S. Pat. No. 4,090,031. In prior playback apparatus, painstaking effort was required to insure that this focal plane coincided with the plane of the optical data on record 10, indicated by reference numeral 56.

The function of lens 34 is to extend the depth of focus of the light beam along axis 50 so as to focus everywhere in a focal zone between points 52 and 54. Consequently, so long as the data pattern 56 is located along the optical axis 50 within this focal zone, it will be in focus.

As beam 20 scans across record 16, it is transmitted through the record or reflected back in accordance with the optical pattern on the record. The reflected light forms return beam 36 which is modulated in accordance with the optical data pattern on the record. This beam passes in the reverse direction through lens 46, mirror 48 and the mirrors of distributor member 44 along the same path traversed by beam 20. The beam splitter then reflects beam 36 to detector means 14. The detector means is a photodetector which is sensitive to the frequency band of return beam 36 to produce an output signal on output 58 which corresponds to the modulation of the return light beam.

In order to provide a suitable amplitude of modulated light beam 36 to detector means 14, it is preferable for beam 36 to vary only in response to modulation by the data pattern on the record. That is, the average amplitude of beam 36 should not vary as a function of the position of the data pattern along the focal zone. This requires a focusing means capable of focusing light to a specified, preferably uniform, axial intensity distribution along at least a portion of the focal zone between points 52 and 54, as shown in FIGS. 6 and 7. A specific structure for a family of lenses, including lens 34, capable of producing such a distribution is the subject of the next subsection.

Axicon Lenses Having a Specifiable Focal Zone Intensity Distribution

An example of lens 34 is shown in FIG. 2. Lens 34 is constructed of a refractive medium such as optical glass having an index of refraction n. The surrounding medium has an index of refraction m.

Lens 34 is a species of axicon. In its more general definition, the term "axicon" means an optical or other energy-focusing element which is a figure of revolution and which images energy from a point source 60 along its axis 62 as a line in a focal zone 64 extending between two separate end points 66, 68. The distinguishing feature of the optical elements of the present invention is that they are designed to provide a prescribed intensity distribution along the focal zone. Such elements have a nonconical, refractive boundary, such as surface 70 in lens 34, which is aspherically-curved so as to focus light to such a distribution. In the case of a lens, the element has a second refractive boundary or surface 72 which is also a figure of revolution, but which is designed to focus light to a point. Surface 72 is typically spherical and can be concave, as shown in FIG. 2, planar (not shown), or convex, as shown in FIG. 9.

In the past, lenses having aspherically-curved surfaces were difficult to generate. In recent years, optical machining technology has reached a stage of development which permits generation of complex surfaces of revolution. Machine tools of this type are disclosed in U.S. Pat. No. 4,083,272 to Miller, in an article by D. M. Miller, et al. entitled "Precision Machining of Optics," Proceedings of the Society of Photo-Optical Instrumentation Engineers, Vol. 159, pp. 32–41, August 1978 and in an article by T. T. Saito entitled "Diamond Turning of Optics," Optical Engineering, Vol. 17, Nov.–Dec., 1978, teachings of which are incorporated herein by reference. The following paragraphs illustrate how a lens is designed in accordance with the invention and specified in terms usable by the apparatus of U.S. Pat. No. 4,083,272, to produce surface 70.

Referring to FIG. 2, surface 72 is assumed to be a concave spherical surface whose radius of curvature equals its distance from source 60. As a result, the energy emanating from source 60 and incident upon surface 72, indicated by a paraxial ray 74 and two pairs of nonaxial rays 76, 78, is unrefracted as it passes through surface 72 into lens 34. Thus, the entire refractive power of lens 34 is concentrated in surface 70.

Accordingly, the analysis and design of surface 70 can be simplified by reference to FIG. 3 in which surface 72 is omitted. The region to the left of surface 70 in FIG. 3 has an index of refraction n and the region to the right of surface 70 has an index of refraction m. For convenience, the optical axis 62 is referred to as the x-axis. Points radially offset from the x-axis are referred to as having a position ρ, which is radially symmetrical about the optical axis. Accordingly, points on an axial cross section of surface 70 can be defined by variable coordinates (x, ρ), as is further explained hereinafter.

Referring to FIGS. 2 and 4, energy emanating from point source 60 is focused by different radial portions of surface 70 into different axial portions of focal zone 64. Paraxial rays 74 passing through a small circle 80 on surface 70 of radius dρ about axis 62 are focused to point 66. The off-axis rays 76, 78 passing through annular rings 82, 84 of radial width dρ on surface 70 are focused further away from such surface. Ray 78 passes through ring 84 at the periphery of surface 70 at a distance R from axis 62. Accordingly, it is focused to the end point 68 of focal zone 64. Ring 82 at a distance ρ, which less than R, from axis 62, focuses ray 76 to point 67. The position of point 67 along the x-axis is a variable function U(ρ) depending on the distance ρ of ring 82 from axis 62. The positions of points 66 and 68 can be considered constants: $U(\rho=o)$ or simply $U(o)$, and $U(\rho=R)$ or simply $U(R)$, respectively.

As mentioned above, a conical or other conventional axicon (not shown), produces a nonuniform output intensity distribution of energy focused along its focal zone. Referring to FIG. 4, if the incident energy has a uniform intensity distribution, as shown in FIG. 5a, less light is focused to a point at the end of the cone by circle 80 than is focused by rings 82 or 84 to points more distant from the cone. Thus, the output intensity distribution of a conical axicon increases along its focal zone for incident light of a uniform intensity distribution.

Lens 34 is designed to produce a uniform or other prescribed intensity distribution between two separate points $U_1$ and $U_2$ in focal zone 64. Such points must fall between end points 66 and 68, as shown in FIG. 2 and typically are selected to coincide with the end points, as shown in FIG. 6. When lens 34 is incorporated in the focusing means of FIG. 1, the energy of beam 20 is focused to a line between points 52, 54 so as to uniformly illuminate the data pattern on the record so long as the pattern is between such points. Points $U_1$ and $U_2$ are chosen far enough apart to allow for relatively loose tolerances in the position of the data pattern, yet close enough together to avoid design extremes, for example, 8 mm. apart.

In designing lens 34 in accordance with the invention, it is assumed that the light source irradiates the surface 70 with light represented by an axially-symmetrical intensity distribution function, f(ρ). Examples of such distribution functions are shown in FIGS. 5a, 5b and 5c.

Referring to FIG. 4, the quantity of energy dE passing through ring 82 is the product of the area of the ring and the incident energy intensity, that is:

$$dE = 2\pi\rho f(\rho) d\rho. \tag{1}$$

This amount of energy is focused onto axis 62 in a zone of length dU, for example, at point 67 in FIG. 2. For a generalized axial intensity distribution, such as is shown in FIG. 8, $$dE/dU = 1/K(U) \tag{2}$$

Distribution function K(U) can be specified for the entire focal zone from U(o) to U(R) or for a portion thereof, for example, between points $U_1$ and $U_2$. For a uniform axial energy distribution, K(U) is a constant K. Therefore, $$dU = KdE = 2\pi K\rho f(\rho) d\rho. \tag{3}$$

To define U(ρ), the foregoing expression is integrated over the radius of lens 34, yielding $$U(\rho) = U(o) + 2\pi K \int_0^\rho \rho f(\rho) d\rho \tag{4}$$

At this stage, it is necessary to specify the input intensity distribution of light source 12. For a laser light source $$f(\rho) = I_o e^{-k\rho^2}. \tag{5}$$

Referring to FIGS. 5b and 5c, the light intensity produced by the laser has a truncated Gaussian distribution. At radius R from its axis, this distribution has an intensity $I_R$. Therefore, $$k = -(1/R^2)\ln(I_R/I_O) \tag{6}$$

Having specified the characteristics of the incident light source and the desired intensity distribution in the focal zone, the integration of equation (4) is completed, yielding $$U(\rho) = U(o) + (\pi K I_o/k)[1 - e^{-k\rho^2}] \tag{7}$$

The foregoing equation specifies the focal zone of a focusing element in terms of the characteristics of a selected incident light source, the desired focal zone intensity distribution and the radius ρ of surface 70. This relationship is employed in a lens equation to define the shape of surface 70, as described below.

FIG. 3 illustrates Fermat's Principle, which is described in Jenkins, et al., *Fundamentals of Optics*, McGraw-Hill Pub., 1957, pp. 7-10. This principle specifies the relationship of the optical path lengths of rays 74 and 76. Paraxial ray 74 passes from point source 60 at a position a along the x-axis to axial focal point 67 at position b through an axial point 80 on surface 70 at position c. Ray 76 passes from point 60 to point 67 through an off-axis point 82 on surface 70 at axial and radial coordinates (x, ρ). Fermat's Principle states that the optical path lengths of the two rays 74, 76 are equal, yielding the following lens equation $$n\sqrt{(x-a)^2 + \rho^2} + m\sqrt{(x-b)^2 + \rho^2} = n(c-a) + m(b-c) \tag{8}$$

where n and m are the indices of refraction of the media on the left and right sides, respectively, of surface 70.

This relationship can be used, as is, in apparatus such as that of U.S. Pat. No. 4,083,272 to generate lens and mirror surfaces capable of focusing light to a focal point. However, the present invention requires a surface 70 capable of focusing incident light onto an extended focal zone 64 with a prescribed intensity distribution, as shown in FIG. 2. Accordingly, the lens equation is modified as follows to specify position b as a focal zone rather than a focal point:

$$n\sqrt{(x-a)^2 + \rho^2} + m\sqrt{(x-U(\rho))^2 + \rho^2} = n(c-a) + m(U(\rho) - c) \tag{9}$$

This equation is used as described in the following example to produce lens 34.

EXAMPLE 1

The following parameters are specified for this example only. Lens 34 has an index of refraction n=1.488. The index of refraction of air is m=1. Lens surface 72 is concavely spherical about a radius of 63.2 mm. The thickness of lens 34 along axis 62 is 9.0 mm. By specifying c=0, the value of a=−72.2. As a result, equation (9) becomes $$1.488 \sqrt{(x + 72.2)^2 + \rho^2} + \sqrt{(x - U(\rho))^2 + \rho^2} = 1.488 \times 72.2 + U(\rho) \quad (10)$$

At the maximum lens radius R=1.5 mm, the incident light intensity $I_R$=0.5 $I_O$ yielding k=0.308. The axial points along the focal zone 64 between which it is desired to have a uniform intensity distribution can be freely chosen, for example, U(o)=40 mm and U(R)=48 mm. As a result $$U(\rho) = 40 + 16[1 - e^{-0.308\rho^2}] \quad (11)$$

Using the foregoing parameters, lens equation (10) is then solved by iterative techniques for various values of $\rho$ to obtain a set of coordinates (x, $\rho$) which define surface 70. To numerically control a lens grinding apparatus, such as that of U.S. Pat. No. 4,083,272, values of x would be computed from equation (10) for incremental values of $\rho$ in the sub-micron range.

Alternatively, one can compute a small number of values of x for larger increments of $\rho$, for example, 0.2 mm increments, as shown in first and third columns of Table 1 below. The second column lists values of U($\rho$) corresponding to each increment of $\rho$.

TABLE 1

| $\rho$ (mm) | U($\rho$) (mm) | x | $x_c$ | $x_c - x$ |
|---|---|---|---|---|
| 0.0 | 40.00000 | 0.0 | | |
| 0.2 | 40.19591 | −0.00187 | −0.00172 | 0.00015 |
| 0.4 | 40.76937 | −0.00740 | −0.00690 | 0.00050 |
| 0.6 | 41.67926 | −0.01644 | −0.01553 | 0.00091 |
| 0.8 | 42.86253 | −0.02880 | −0.02762 | 0.00118 |
| 1.0 | 44.24135 | −0.04426 | −0.04318 | 0.00108 |
| 1.2 | 45.73163 | −0.06264 | −0.06224 | 0.00040 |
| 1.4 | 47.25127 | −0.08385 | −0.08479 | −0.00094 |
| 1.6 | 48.72744 | −0.10782 | −0.11087 | −0.00305 |

These values of x and $\rho$ are used to generate a fourth or higher order polynomial characterizing surface 70 in a form which lens makers are presently accustomed to using. The first step is to curve fit a spherical surface to the foregoing values. The standard spherical lens equation $$\frac{n - m}{r} = \frac{n}{(c - a)} + \frac{m}{(b - c)} \quad (12)$$

provides a first approximation. Using the exemplary values for n, m, a and setting b=U($\rho$=0), the spherical surface has a radius of curvature r≈10.7 mm. Comparison of the coordinates of such a surface with the coordinates of surface 70 listed in Table 1 yields a monotonically increasing error function. Therefore, a somewhat larger radius r better fits surface 70. For a central value of $\rho$, for example $\rho$=0.8, r≈11.6 mm. At this radius, the error at the axis of surface 70 is approximately equal to the negative of the error at the periphery of surface 70, that is, at R=1.5 mm.

The next step is to compute values $x_c$ along the x-axis for the values of $\rho$ in column 1 of Table 1 by solving the equation for a circle of radius r centered on the x-axis at x=−11.6 mm.

$$x_c = -11.6 + \sqrt{134.56 - \rho^2} \quad (13)$$

These values are listed in the fourth column of Table 1. The last column contains values of the difference $\Delta x$ between corresponding values of the third and fourth columns.

This difference is then fitted to a fourth power equation of the form $$\Delta x = x_c - x = a_1\rho + a_2\rho^2 + a_3\rho^2 + a_4\rho^4 \quad (14)$$

Using the data of Table 1, surface 70 can then be specified by $$x = x_c - \Delta x = -11.6 + \sqrt{134.56 - \rho^2} + 0.000610\rho - 0.006919\rho^2 + 0.005951\rho^3 - 0.00070\rho^4 \quad (15)$$

This specification of surface 70 yields a precision of about 50 nanometers, which is much less than the wavelength of visible light and approaches the accuracy of existing lens-turning apparatus.

EXAMPLE 2

Equation (9) can also be used to specify the shape of an axicon reflector surface in accordance with invention for focusing light along dashed lines 76' to axial position b' by specifying the indices of refraction n=1 and m=−1.

Using the parameters of Example 1, the surface of such a reflector would be defined by equation (11) and equation (16) below.

$$\sqrt{(x + 72.2)^2 + \rho^2} + \sqrt{(x - U(\rho))^2 + \rho^2} = 72.2 - U(\rho) \quad (16)$$

It should be noted that, due to reflection, the sign of U($\rho$) is negative.

EXAMPLE 3

As mentioned above, axicon lenses in which surface 72 is not a concave sphere can also be designed in accordance with the invention. One example is a double convex lens 100, shown in FIG. 9. Lens 100 has a convex axicon lens surface 102 and a convex point-focusing lens surface 104 in lieu of surface 72. Following is a specification of surface 102 and 104 in accordance with the invention.

Surface 104 transmits to surface 102 an image of point source 60 which appears to be located at a position other than its actual location a. For example, surface 104 can be designed to bend rays 106 from source 60 inwardly toward axis 62. Tracing these rays toward the source along dashed lines 108, source 60 appears at a position a' more distant from the lens. The shape of surface 104 can be specified to obtain any position a' by substituting a' for b in equation (8) and, additionally, specifying the values for the indices of refraction m and n and positions a of the source 60 and c' of the apex of surface 104 along the x-axis yielding, $$n\sqrt{(x-a)^2 + \rho^2} + m\sqrt{(x-a')^2 + \rho^2} = n(c'-a) + m(a'-c') \quad (17)$$

To specify surface 102, the position a' is determined from equation (17) and substituted for position a in equation (9), yielding $$n\sqrt{(x-a')^2 + \rho^2} + m\sqrt{(x-U(\rho))^2 + \rho^2} = n(c-a') + m(U(\rho)-c) \quad (18)$$

Equations (17) and (18) can be used in the manner described in Example 1 to control a lens-turning apparatus to generate surfaces 104 and 102, respectively. However, the procedure can be further simplified by specifying surface 104 as one which transmits to surface 102 an image of source 60 positioned an infinite distance from lens 34, as indicated by dashed lines 90 in FIG. 9.

With surface 104 so specified, $a' \to -\infty$ and equation (18) simplifies to $$nx + m\sqrt{(x-U(\rho))^2 + \rho^2} = (n-m)c + mU(\rho) \quad (19)$$

This equation is readily solved for values of x and $\rho$ to control a lens-turning machine in making surface 102.

Although specific examples of optical elements have been described, the present invention includes many other energy-focusing elements designed to focus incident energy into an axial focal zone with a prescribed intensity distribution. For example, equation (19) can also be used to specify an acoustical axicon lens for an ultrasonic transducer. Energy-focusing systems can, within the scope of the invention, be arranged differently from the system described herein. The invention can also be embodied in different forms of optical playback apparatus.

Having illustrated and described a preferred embodiment of the invention and several examples thereof, it should be apparent to those skilled in the art that the invention may be modified in arrangement and detail. We claim as our invention all such modifications as come within the true spirit and scope of the following claims.

We claim:

1. An axicon focusing element comprising a nonconical, aspheric focusing medium defining a figure of revolution about an axis for producing a predetermined output intensity distribution of energy between two different points $U_1$ and $U_2$ along said axis when said axicon focusing element is irradiated by a source of energy directed along said axis, said source producing an axially symmetric input intensity distribution of said energy and said figure of revolution being defined in accordance with a radially continuous, curved function of said input and output intensity distributions.

2. An axicon according to claim 1 in which the input energy distribution is characterized by a truncated Gaussian distribution.

3. An axicon according to claim 1 in which the input energy distribution is radially uniform.

4. An axicon according to claim 1 in which the output energy distribution is uniform between points $U_1$ and $U_2$.

5. An axicon focusing element comprising a nonconical, curved focusing medium defining a figure of revolution about an axis for producing a predetermined output intensity distribution of energy between two different points $U_1$ and $U_2$ along said axis when said axicon focusing element is irradiated by a source of energy directed along said axis, said source producing an axially symmetric input intensity distribution of said energy and said figure of revolution being defined in accordance with a function of said input and output intensity distributions;

the focusing medium including refractive media defining an aspheric refractive boundary characterized by the equation $$n\sqrt{(x-a)^2 + \rho^2} + m\sqrt{(x-U(\rho))^2 + \rho^2} = n(c-a) + m(U(\rho)-c)$$

where $$\int_{U(o)}^{U(\rho)} \frac{dU}{K(U)} = 2\pi \int_o^\rho \rho f(\rho) d\rho$$

$\rho$ is a radial distance from said axis;

$U(\rho)$ is the distance from said boundary to a first point along said axis at which energy incident on the boundary in an annular zone of radius $\rho$ is focused;

$U(o)$ is the distance from said boundary to a second point along said axis at which energy incident upon a circular zone at the center of the boundary is focused;

$K(U)$ is the output energy intensity distribution between points $U_1$ and $U_2$;

$f(\rho)$ is the axially symmetric input intensity distribution of energy incident upon the focusing means;

n and m are the indices of refraction of the refractive media;

x is the axial coordinate of a point on said boundary;

a is the position of the source along the x-axis; and c is the position of the center of said boundary along the x-axis.

6. An axicon according to claim 5 in which the refractive media includes a single element lens having a refractive surface defining said boundary.

7. An axicon according to claim 5 in which the refractive media includes a reflector having a reflective surface defining said boundary.

8. An axicon according to claim 5 in which $$f(\rho) = I_0 e^{-k\rho^2},$$

where $I_0$ is the input energy intensity at $\rho=0$;

$f(\rho)=0$ for any radius $\rho$ greater than a maximum radius R; and $f(R)=I_0 e^{-kR^2}$ such that:

$$\int_{U(o)}^{U(\rho)} \frac{dU}{K(U)} = \frac{\pi I_0(1 - e^{-k\rho^2})}{k}$$

9. An axicon according to claim 8 in which $K(U)=K$, a constant between $U(o)$ and $U(\rho=R)$, such that:

$$U(\rho) = U(o) + \frac{\pi K I_O (1 - e^{-k\rho^2})}{k}.$$

10. A method of making a focusing element for focusing energy to a line between two different points $U_1$ and $U_2$ with a preselected output intensity distribution K(U), comprising:
  selecting an output intensity distribution K(U);
  selecting two refractive media having indices of refraction m and n;
  selecting an energy source for producing an energy beam having an axially symmetric intensity distribution $f(\rho)$;
  forming a refractive boundary between said media defining a figure of revolution about an axis containing said two points in accordance with the equation $$n\sqrt{(x-a)^2 + \rho^2} + m\sqrt{(x - U(\rho))^2 + \rho^2} =$$
$$n(c - a) + m(U(\rho) - c);$$

where
  x is a variable point on said surface along said axis;
  $\rho$ is a radial distance from said axis;
  a is the position of the source along the axis;
  c is the position of the center of said boundary along the axis;

$$\int_{U(o)}^{U(\rho)} \frac{dU}{K(U)} = 2\pi \int_o^{\rho} \rho f(\rho) d\rho$$

defines the focal zone to which the boundary focuses light incident from said source;
  $U(\rho)$ being the distance between the boundary and a variable point on the axis at which energy from an annular zone of the boundary at radius $\rho$ is focused;
  U(o) being the distance between the boundary and a specified point on the axis at which energy from the boundary at $\rho=0$ is focused.

11. A method according to claim 10 in which the forming step includes determining from said equation axial coordinates for numerous monotonically-increasing values of $\rho$ and providing said values to a lens-turning apparatus to control the turning of said boundary.

12. A method according to claim 10 in which the forming step includes determining from said equation axial coordinates for a small number of values of $\rho$, curve-fitting the equation of a sphere of a radius r plus a fourth power polynomial to said axial coordinates to generate a characterization of said boundary in accordance with the equation $$x = r + \sqrt{r^2 - \rho^2} + a_1\rho + a_2\rho^2 + a_3\rho^3 + a_4\rho^4,$$

and controlling a lens-turning apparatus to generate a surface approximating said boundary, the values of $a_1$, $a_2$, $a_3$ and $a_4$ being selected so as to limit the difference between said surface and said boundary to less than 50 nanometers.

13. A single element lens for focusing a point source of light in air to a focal zone with a uniform intensity distribution within said zone, the lens comprising:

a refractive medium having a refractive index n whose shape is a figure of revolution of radius R about an optical axis;
said medium having a point-focusing first surface and an aspheric second surface in spaced apart coaxial relationship to said first surface;
said second surface being defined by $$n\sqrt{(x-a)^2 + \rho^2} + \sqrt{(x - U(\rho))^2 + \rho^2} = U(\rho);$$

where
a is the negative of the distance along the optical axis from said second surface to the position of an image of said point source;
x and $\rho$ are axial and radial coordinates of points on said second surface; and $$U(\rho) = U(o) + \left(\frac{U(R) - U(o)}{I_R/I_0}\right)[1 - e^{-k\rho^2}],$$

wherein
U(o) and U(R) are the end points of said focal zone;
$I_R/I_O$ is the ratio of incident energy intensity at the periphery of the lens to incident energy intensity at the axis of the lens;
$e^{-k\rho^2}$ is an axially symmetrical function; and
$k = -(1/R^2) \ln(I_R/I_O)$.

14. A lens according to claim 13 in which said first surface is a concave spherical surface having a radius of curvature equal to the distance of the point source to the first surface and a is the negative of the sum of said radius of curvature and the thickness of the lens along said axis.

15. A lens according to claim 13 in which said first surface is a convex surface shaped to form an image of said point source at infinity and said second surface is defined by $$nx + \sqrt{(x - U(\rho))^2 + \rho^2} = U(\rho).$$

16. An energy focusing system for focusing energy to a line extending between two different points with a predetermined intensity distribution K(U) along said line, the system comprising:
  energy emitting means defining a point source for emitting energy having an axially symmetric radial intensity distribution $f(\rho)$ along said axis; and
  focusing means including an axicon having a nonconical, aspheric surface continuously curved radially of said axis for focusing at least a portion of said energy to said line;
  said surface being radially configured to complement the radial intensity distribution $f(\rho)$ so as to produce said predetermined axial intensity distribution.

17. An axicon focusing element comprising a nonconical, aspheric focusing medium defining a figure of revolution about an axis for producing a predetermined output intensity distribution of energy between two different points $U_1$ and $U_2$ along said axis when said axicon focusing element is irradiated by a source of energy directed along said axis, said source producing an axially symmetric input intensity distribution of said energy and said figure of revolution being jointly defined by axially symmetric input intensity distribution f($\rho$) and predetermined output intensity distribution K(U) in accordance with the equation $$\int_{U(o)}^{U(\rho)} \frac{dU}{K(U)} = 2\pi \int_{o}^{\rho} \rho f(\rho) d\rho$$

such that the focusing means is operable to focus said energy to said line with said predetermined intensity distribution;

K(U) being the predetermined output intensity distribution between points $U_1$ and $U_2$;

U($\rho$) being a variable defining a distance along the axis from the focusing element to a point at which said portion of energy is focused by a zone of said element at a radial distance $\rho$ from the axis; and U(o) being the focal point for energy from said source incident on said element at $\rho=0$.

* * * * *

UNITED STATES PATENT AND TRADEMARK OFFICE
CERTIFICATE OF CORRECTION

PATENT NO. : 4,545,653

DATED : October 8, 1985

INVENTOR(S) : Bryon B. Brenden and James T. Russell

It is certified that error appears in the above-identified patent and that said Letters Patent is hereby corrected as shown below:

Column 3, line 33, "specificable" should be —specifiable—.

Column 7, line 55, equation (1) should read:

$$dE = 2\pi \rho f(\rho) d\rho$$

Column 8, line 14, equation (5) should read:

$$f(\rho) = I_0 e^{-k\rho^2}$$

Column 8, line 28, equation (7) should read:

$$U(\rho) = U(o) + \frac{\pi K I_0}{k} [1 - e^{-k\rho^2}]$$

Column 9, line 24, equation (11) should read:

$$U(\rho) = 40 + 16 [1-e^{-0.308\rho^2}]$$

Column 12, line 56, the equation should read:

$$f(\rho) = I_0 e^{-k\rho^2},$$

Column 12, line 58, $I_p$ should be —$I_0$—.

Column 12, line 61, the equation should read:

$$f(R) = I_0 e^{-kR^2}$$

UNITED STATES PATENT AND TRADEMARK OFFICE
CERTIFICATE OF CORRECTION

PATENT NO. : 4,545,653

DATED : October 8, 1985

INVENTOR(S) : Bryon B. Brenden and James T. Russell

It is certified that error appears in the above-identified patent and that said Letters Patent is hereby corrected as shown below:

Column 12, lines 63-65, the equation should read:

$$\int_{U(o)}^{U(\rho)} \frac{dU}{K(U)} = \frac{\pi I_0 (1 - e^{-k\rho^2})}{k}$$

Column 13, lines 2-4, the equation should read:

$$U(\rho) = U(o) + \frac{\pi K I_0 (1 - e^{-k\rho^2})}{k}$$

Column 13, line 46, "ircludes" should be --includes--.

Column 14, lines 20-22, the equation should read:

$$U(\rho) = U(o) + \left(\frac{U(R)-U(o)}{I_R/I_0}\right) [1-e^{-k\rho^2}],$$

Signed and Sealed this

Fourth Day of February 1986

[SEAL]

Attest:

DONALD J. QUIGG

Attesting Officer

Commissioner of Patents and Trademarks